US012675373B2

(12) United States Patent (10) Patent No.: US 12,675,373 B2
Zhang et al. (45) Date of Patent: Jul. 7, 2026

(54) METHOD, DEVICE, AND COMPUTER PROGRAM PRODUCT FOR RECOVERING DATA

(71) Applicant: Dell Products L.P., Round Rock, TX (US)

(72) Inventors: Weibing Zhang, Beijing (CN); Lei Gao, Beijing (CN); Chen Gong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 18/931,307

(22) Filed: Oct. 30, 2024

(65) Prior Publication Data

US 2025/0335315 A1 Oct. 30, 2025

(30) Foreign Application Priority Data

Apr. 26, 2024 (CN) ......................... 202410516990.8

(51) Int. Cl.
*G06F 11/10* (2006.01)
*G06F 11/1446* (2026.01)

(52) U.S. Cl.
CPC ...... *G06F 11/1469* (2013.01); *G06F 2201/84* (2013.01)

(58) Field of Classification Search
None
See application file for complete search history.

(56) References Cited

U.S. PATENT DOCUMENTS

| | | |
|---|---|---|
| 9,026,499 B1 | 5/2015 | Rajimwale et al. |
| 9,928,002 B2 | 3/2018 | Kumarasamy et al. |
| 9,940,460 B1 | 4/2018 | Derbeko et al. |
| 9,990,253 B1 | 6/2018 | Rajimwale et al. |
| 10,078,459 B1 | 9/2018 | Natanzon et al. |
| 10,409,986 B1 | 9/2019 | Natanzon et al. |
| 10,650,146 B1 | 5/2020 | Gaurav et al. |
| 10,719,307 B2 | 7/2020 | Kanada et al. |
| 10,742,665 B2 | 8/2020 | Gu et al. |
| 10,795,994 B2 | 10/2020 | Mehta et al. |

(Continued)

OTHER PUBLICATIONS

Extended European Search Report for application No. 22175875.8, dated Nov. 17, 2022, 9 pages.

(Continued)

*Primary Examiner* — Jau Shya Meng
(74) *Attorney, Agent, or Firm* — BainwoodHuang

(57) ABSTRACT

Techniques are directed to recovering data. Such techniques involve generating raw snapshots of a storage system, each of the snapshots having a snapshot ID. Such techniques further involve determining, based on the raw snapshots, at least one of attacked data blocks in the storage system, the data block of the storage system having a data block ID. Such techniques further involve determining, based on the data block ID of each data block of the at least one of the attacked data blocks, a first target snapshot having a corresponding snapshot ID, the first target snapshot having a latest unattacked replica corresponding to the data block. Such techniques further involve recovering the data block corresponding to the first target snapshot by loading the first target snapshot separately for each data block.

20 Claims, 7 Drawing Sheets

400 ↘

(56) References Cited

U.S. PATENT DOCUMENTS

| | | | |
|---|---|---|---|
| 11,086,826 | B2 | 8/2021 | Thummala et al. |
| 11,170,104 | B1 | 11/2021 | Stickle et al. |
| 11,245,420 | B2 | 2/2022 | Kim et al. |
| 11,321,195 | B2 | 5/2022 | Dhatrak |
| 11,663,336 | B1 | 5/2023 | Armangau et al. |
| 12,093,391 | B2 | 9/2024 | Armangau et al. |
| 12,130,918 | B2 * | 10/2024 | Strogov .............. G06F 11/1453 |
| 2018/0075234 | A1 | 3/2018 | Boutnaru |
| 2018/0322280 | A1 | 11/2018 | Borlick et al. |
| 2019/0235973 | A1 * | 8/2019 | Brewer .............. G06F 11/1469 |
| 2020/0226256 | A1 | 7/2020 | Gaurav et al. |
| 2020/0250522 | A1 | 8/2020 | Meiri et al. |
| 2021/0042411 | A1 | 2/2021 | Annen et al. |
| 2021/0103490 | A1 | 4/2021 | Lecrone et al. |
| 2022/0027472 | A1 | 1/2022 | Golden et al. |
| 2022/0091942 | A1 * | 3/2022 | Mukku ............... G06F 11/1464 |
| 2023/0131333 | A1 | 4/2023 | Mccolgan et al. |
| 2024/0095358 | A1 | 3/2024 | Zhang et al. |
| 2024/0160728 | A1 | 5/2024 | Flynn et al. |
| 2024/0211598 | A1 | 6/2024 | Zhang et al. |
| 2024/0311472 | A1 | 9/2024 | Zhang et al. |
| 2024/0394153 | A1 * | 11/2024 | Portz ................... G06F 11/1451 |
| 2025/0103706 | A1 * | 3/2025 | Zhang ................... G06F 21/554 |

OTHER PUBLICATIONS

Zhang, Ming; et al.; "Method, Electronic Device and Computer Program Product for Recovering Data," U.S. Appl. No. 18/615,029, filed Mar. 25, 2024.

* cited by examiner

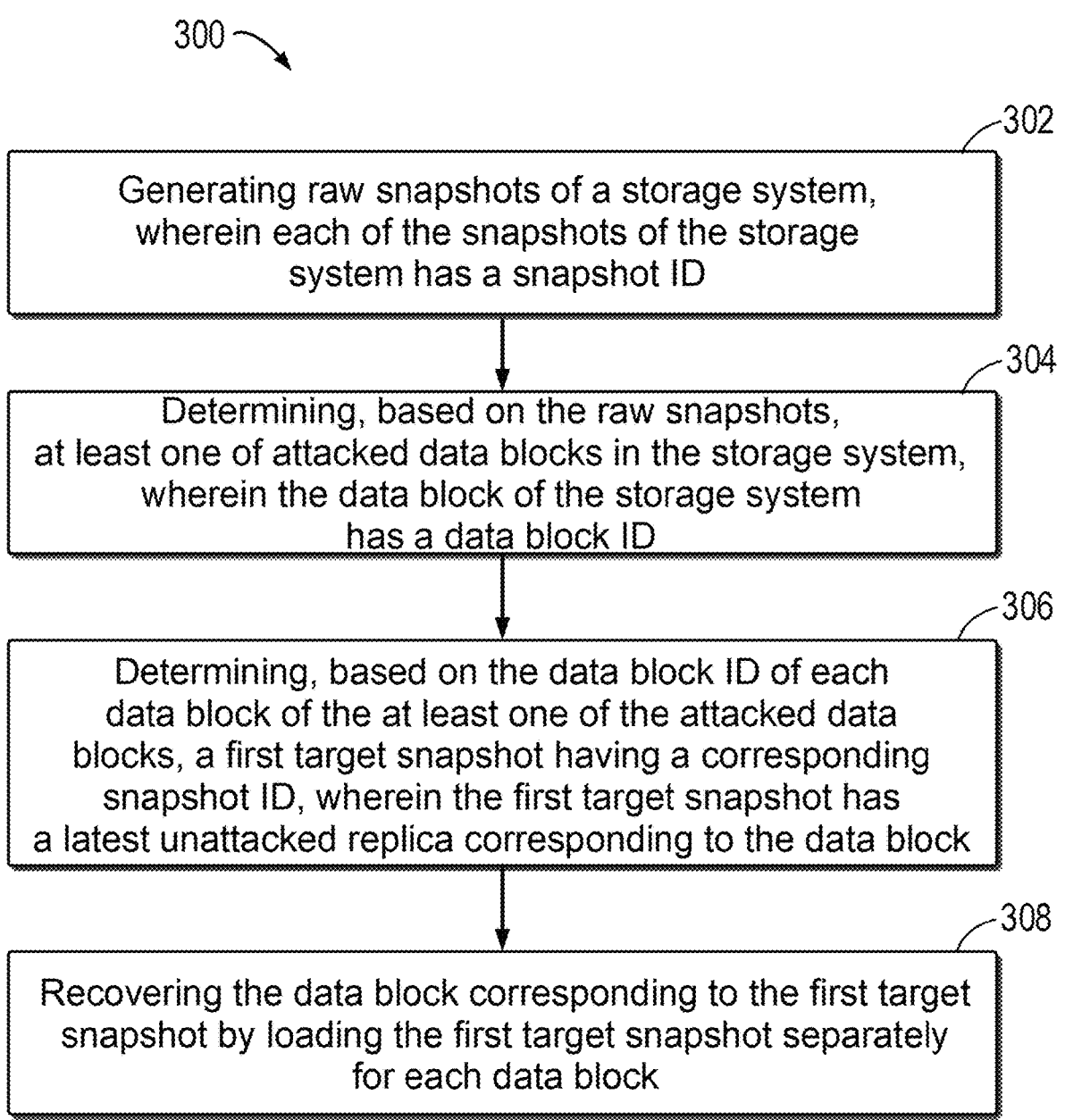

300

302

Generating raw snapshots of a storage system,
wherein each of the snapshots of the storage
system has a snapshot ID

304

Determining, based on the raw snapshots,
at least one of attacked data blocks in the storage system,
wherein the data block of the storage system
has a data block ID

306

Determining, based on the data block ID of each
data block of the at least one of the attacked data
blocks, a first target snapshot having a corresponding
snapshot ID, wherein the first target snapshot has
a latest unattacked replica corresponding to the data block

308

Recovering the data block corresponding to the first target
snapshot by loading the first target snapshot separately
for each data block

402
In response to creating a new snapshot in the storage system, obtaining a current snapshot ID and a next snapshot ID in the storage system 404
Allocating the current snapshot ID to the new snapshot 406
Using the next snapshot ID as the current snapshot ID 408
Increasing the next snapshot progressively as a new next snapshot ID

1

METHOD, DEVICE, AND COMPUTER PROGRAM PRODUCT FOR RECOVERING DATA

CROSS-REFERENCE TO RELATED APPLICATION

This application claims priority to Chinese Patent Application No. CN202410516990.8, on file at the China National Intellectual Property Administration (CNIPA), having a filing date of Apr. 26, 2024, and having "METHOD, DEVICE, AND PRODUCT FOR RECOVERING DATA" as a title, the contents and teachings of which are herein incorporated by reference in their entirety.

TECHNICAL FIELD

The present disclosure relates to the field of data storage, and more particularly, relates to a method, a device, and a computer program product for recovering data.

BACKGROUND

Data storage servers are often the target of ransomware attacks. Snapshot scheduling is one way to protect data. Storage snapshots are a set of reference marks for data at a specific point in time, providing users with accessible replicas of data they can roll back to.

Snapshot technology includes system-level snapshots and file-level snapshots. The system-level snapshots capture the complete state of an entire system or data volume at a specific point in time, including all files, directories, system configuration, and metadata. The system-level snapshots are often used for creating a backup or recovery point of the entire system such that the system can be restored to its previous state in the event of failure or data loss. The file-level snapshots focus more on specific files or directories in a file system. They capture only the state of these files or directories at a certain point in time and do not involve the rest of the entire system. The file-level snapshots are generally used for protecting important files or directories from data loss or mal-operation.

The snapshot technology typically includes two different ways of data reading and writing: Redirect-on-Write (ROW) and Copy-on-Write (COW). ROW refers to writing data directly to a snapshot volume during data writing. In the process of reading a source volume, data before the snapshot creation is read from the source volume, and data generated after the snapshot creation is read from the snapshot volume. COW refers to, on the other hand, replicating data of the source volume before data writing, and then writing new data to the source volume. During a read operation, a snapshot system first determines whether data that the upper-level business needs to read is in the snapshot volume, and if it is in the snapshot volume, the snapshot system reads the data directly from the snapshot volume; and if it is not in the snapshot volume, the snapshot system queries a mapping table to read from a logical address of a corresponding source volume.

SUMMARY OF THE INVENTION

Embodiments of the present disclosure provide a method, device, and computer program product for recovering data. In a first aspect of the embodiments of the present disclosure, a method for recovering data is provided. The method includes generating raw snapshots of a storage system, each of the snapshots of the storage system having a snapshot ID. The method further includes determining, based on the raw snapshots, at least one of attacked data blocks in the storage system, the data block of the storage system having a data block ID. The method further includes determining, based on the data block ID of each data block of the at least one of the attacked data blocks, a first target snapshot having a corresponding snapshot ID, the first target snapshot having a latest unattacked replica corresponding to the data block. The method further includes recovering the data block corresponding to the first target snapshot by loading the first target snapshot separately for each data block.

In a second aspect of the embodiments of the present disclosure, there is provided an electronic device. The electronic device includes one or more processors; and a storage apparatus for storing one or more programs that, when executed by the one or more processors, cause the one or more processors to implement a method for recovering data, the method including generating raw snapshots of a storage system, each of the snapshots of the storage system having a snapshot ID. The method further includes determining, based on the raw snapshots, at least one of attacked data blocks in the storage system, the data block of the storage system having a data block ID. The method further includes determining, based on the data block ID of each data block of the at least one of the attacked data blocks, a first target snapshot having a corresponding snapshot ID, the first target snapshot having a latest unattacked replica corresponding to the data block. The method further includes recovering the data block corresponding to the first target snapshot by loading the first target snapshot separately for each data block.

In a third aspect of the embodiments of the present disclosure, a computer-readable storage medium is provided, the computer-readable storage medium having a computer program stored thereon that, when executed by a processor, implements a method for recovering data. The method includes generating raw snapshots of a storage system, each of the snapshots of the storage system having a snapshot ID. The method further includes determining, based on the raw snapshots, at least one of attacked data blocks in the storage system, the data block of the storage system having a data block ID. The method further includes determining, based on the data block ID of each data block of the at least one of the attacked data blocks, a first target snapshot having a corresponding snapshot ID, the first target snapshot having a latest unattacked replica corresponding to the data block. The method further includes recovering the data block corresponding to the first target snapshot by loading the first target snapshot separately for each data block.

It should be understood that the contents described in the Summary of the Invention part is neither intended to limit key or essential features of the embodiments of the present disclosure, nor intended to limit the scope of the present disclosure. Other features of the present disclosure will become readily understood from the following descriptions.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which:

FIG. 3 illustrates a flowchart of a method for recovering data according to some embodiments of the present disclosure;

DETAILED DESCRIPTION

Figure 1:
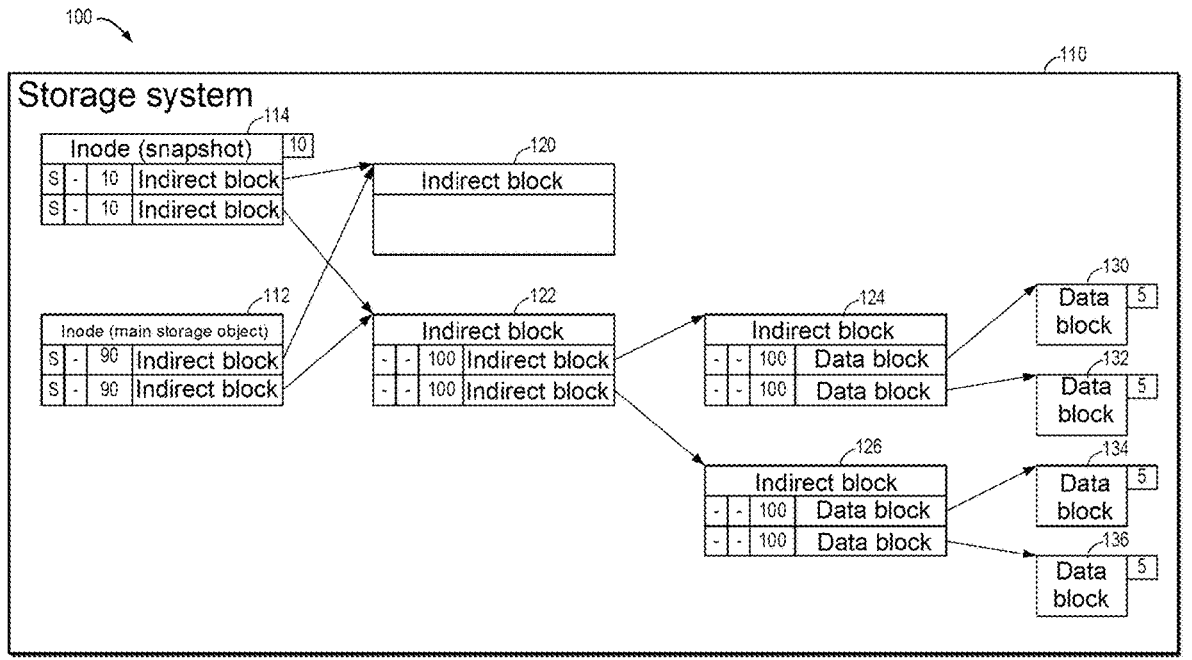
FIG. 1 illustrates a schematic diagram of an example environment in which a plurality of embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

Ransomware is a major threat to user data security. Data storage servers are often the target of ransomware attacks. Storage systems typically have a very large space, and accordingly, before sending a ransom request to a user, an attacker may silently encrypt as much data as possible for a long period of time to enhance his/her threat of demanding a ransom payment. In this period, the user cannot access raw data.

Snapshot scheduling is a common way to protect data, allowing a user to select a snapshot he/she wants to roll back to when a ransomware attack is exposed. However, since ransomware is less prone to being detected by the storage systems, new clean working data and ransomware-encrypted data are often mixed and coexist in a plurality of snapshots.

Most of the relevant ransomware attack recovery methods work with system-level snapshots. Rolling back to previous snapshots may recover historical data, but the user still needs to load each snapshot and manually check the corresponding files to obtain the latest clean data. However, the process of loading each snapshot and performing file checking is slow and time-consuming. In the case of mass storage objects, the complete snapshot file checking may severely impact system performance.

File-level snapshots are another approach of data recovery that captures the state of only some specific files or directories at a certain point in time, and does not involve the rest of the entire system. The file-level snapshots may assist in recovery from some ransomware. Because earlier versions of files are often still stored in the same file system, however, the attacker may encrypt all the earlier versions, leading to a failure in data recovery using the file-level snapshots.

To this end, the embodiments of the present disclosure provide a solution for recovering data. In the embodiments of the present disclosure, raw snapshots of a storage system may be generated, and each snapshot of the storage system has a snapshot ID. Further, at least one of attacked data blocks in the storage system may be determined based on the raw snapshots, and the data block of the storage system has a data block ID. Furthermore, a first target snapshot having a corresponding snapshot ID may be determined based on the data block ID of each data block of the at least one of the attacked data blocks, and the first target snapshot has a latest unattacked replica corresponding to the data block. In addition, the data block corresponding to the first target snapshot may be recovered by loading the first target snapshot separately for each data block.

In this way, it is possible to detect snapshots containing the latest clean data blocks and to perform block-level recovery from different snapshots to recover as much clean data as possible, in the case that new clean working data and ransomware-encrypted data after a ransomware attack are mixed and coexist in a plurality of snapshots.

FIG. 1 illustrates a schematic diagram of an example environment 100 in which a plurality of embodiments of the present disclosure can be implemented. As shown in FIG. 1, the storage system 110 includes a main storage object 112 and a snapshot 114. The main storage object 112 is data in a main memory of the storage system 110. In order to effectively protect the data, the storage system 110 often automatically generates a snapshot for the main storage object 112 in accordance with a specific time or frequency. For example, the storage system 110 may generate a new snapshot every hour based on importance of the data. Thus, the storage system 110 usually includes a large number of snapshots. It should be noted that the example environment 100 illustrates one snapshot 114 for the purpose of example illustration only.

As shown in FIG. 1, in the environment 100, the storage system 110 further includes indirect blocks 120-126 and data blocks 130-136. The indirect blocks are not used for storing file data, but are dedicated to storing location information for other data blocks that actually store file data. For example, both the main storage object 112 and the snapshot 114 may be indexed to the locations of the data block 130 and the data block 132 via the indirect block 122 and the indirect block 124.

As shown in FIG. 1, in the environment 100, the snapshot 114 is a reference mark for the data blocks 130-136 at a particular point in time. After a ransomware attack on the main storage object 112 of the storage system 110, a user may choose to perform a rollback to the snapshot 114 to obtain a data block replica saved at a particular point in time, thus recovering earlier data.

Figure 2:
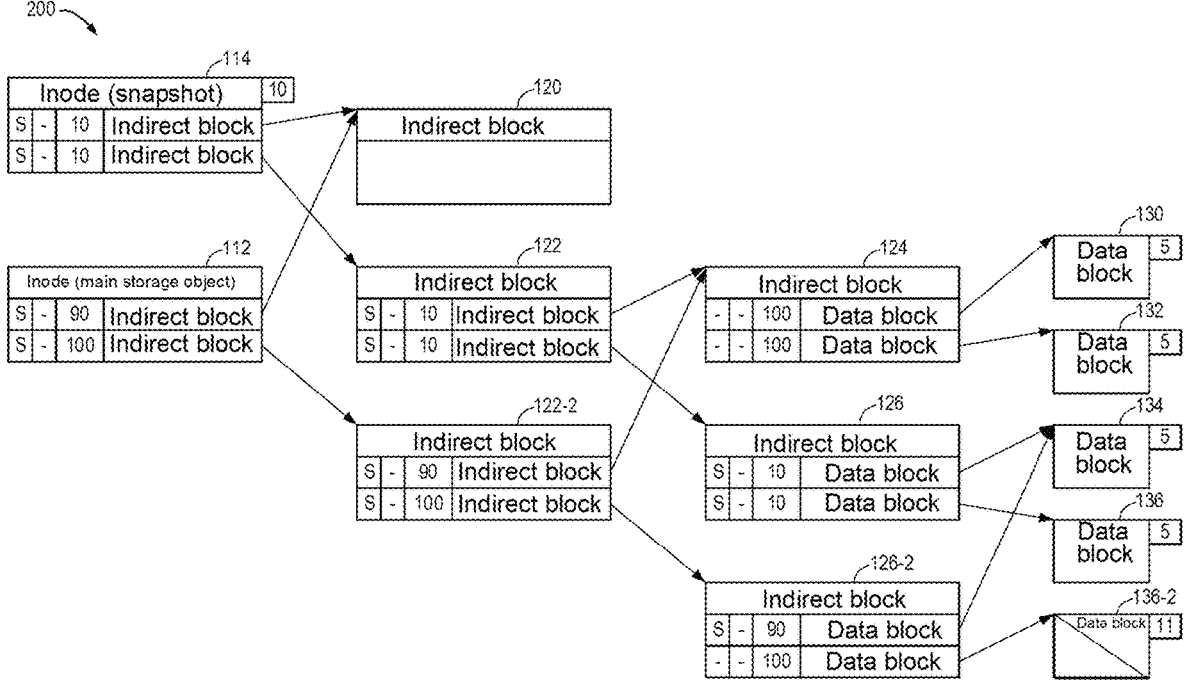
FIG. 2 illustrates a schematic diagram of a process of writing data by ROW according to some embodiments of the present disclosure.

The process of the ransomware attack and working principle of data rollback via the snapshot 114 will be described below in conjunction with FIG. 2. FIG. 2 illustrates a schematic diagram of a process 200 of writing data by ROW according to some embodiments of the present disclosure. As shown in FIG. 2, when a storage system 110 is subject to a ransomware attack, ransomware may make a new write request to a main storage object 112. When the new write request reaches the main storage object 112 of the storage system 110, based on the ROW, the storage system 110 will create a new data block 136-2 for storing data and simultaneously create indirect blocks 122-2 and 126-2 for indexing the main storage object 112 to the new data block 136-2. The new data block 136-2 is created by the ransomware, and accordingly it may include encrypted data. Moreover, if the storage system 110 does not recognize the ransomware attack, the new data block 136-2, which includes the encrypted data, will also be saved to a new snapshot to be mixed with data newly written or modified by the user subsequently.

As shown in FIG. 2, although the ransomware writes new encrypted data into the main storage object 112, the snapshot 114 may still be indexed to data blocks 130-136 via indirect blocks. For example, a file A is stored in the storage system 110, and the file A includes the data blocks 130-136. When the file A is subjected to a ransomware attack and is written with encrypted data, the new file A is corrupted because it contains the encrypted data block 136-2. At this point, the storage system 110 may roll back to the snapshot 114 to obtain clean replicas of the data blocks 130-136 for a particular period of time that are recorded in the snapshot 114, thus recovering the file A.

Returning to FIG. 1, in some embodiments, snapshots of the storage system 110 may be stored at different locations, depending on different technical requirements. For example, the snapshots may be stored directly on a local storage device. The snapshots stored in this approach are fast, but data of the snapshots is prone to loss or corruption due to system failures. For example, the snapshots may also be stored on an external storage device, such as a SAN (storage area network) or NAS (network attached storage). This approach enables centralized management and backup of the snapshots to ensure data security and recoverability, but it may also increase cost and complexity, requiring additional hardware and management resources. As another example, the snapshots may also be stored in a distributed storage system or a cloud storage. The present disclosure does not impose limitations on storage locations of the snapshots.

As shown in FIG. 1, in the environment 100, the snapshot 114 has a snapshot ID for marking a version of the snapshot. For example, the snapshot 114 has a snapshot ID of 10, indicating that the snapshot 114 is the 10th snapshot of the storage system 110 that is chronologically generated. The data blocks 130-136 have data block IDs for marking the version of the snapshot in which the data blocks are created or changed. For example, the data blocks 130-136 each have a data block ID of 5, indicating that the data blocks 130-136 are created or changed in the 5th snapshot of the storage system 110. In some embodiments, the data block ID may be stored in non-vulnerable metadata in the storage system 110.

FIG. 3 illustrates a flowchart of a method 300 for recovering data according to some embodiments of the present disclosure. As shown in FIG. 3, at block 302, the method 300 includes generating raw snapshots of a storage system, each snapshot of the storage system having a snapshot ID. In some embodiments, after a ransomware attack on the storage system is detected, a new snapshot of the current storage system may be created and loaded to be used as an object to be recovered, so as to perform a further recovery operation.

Figure 4:
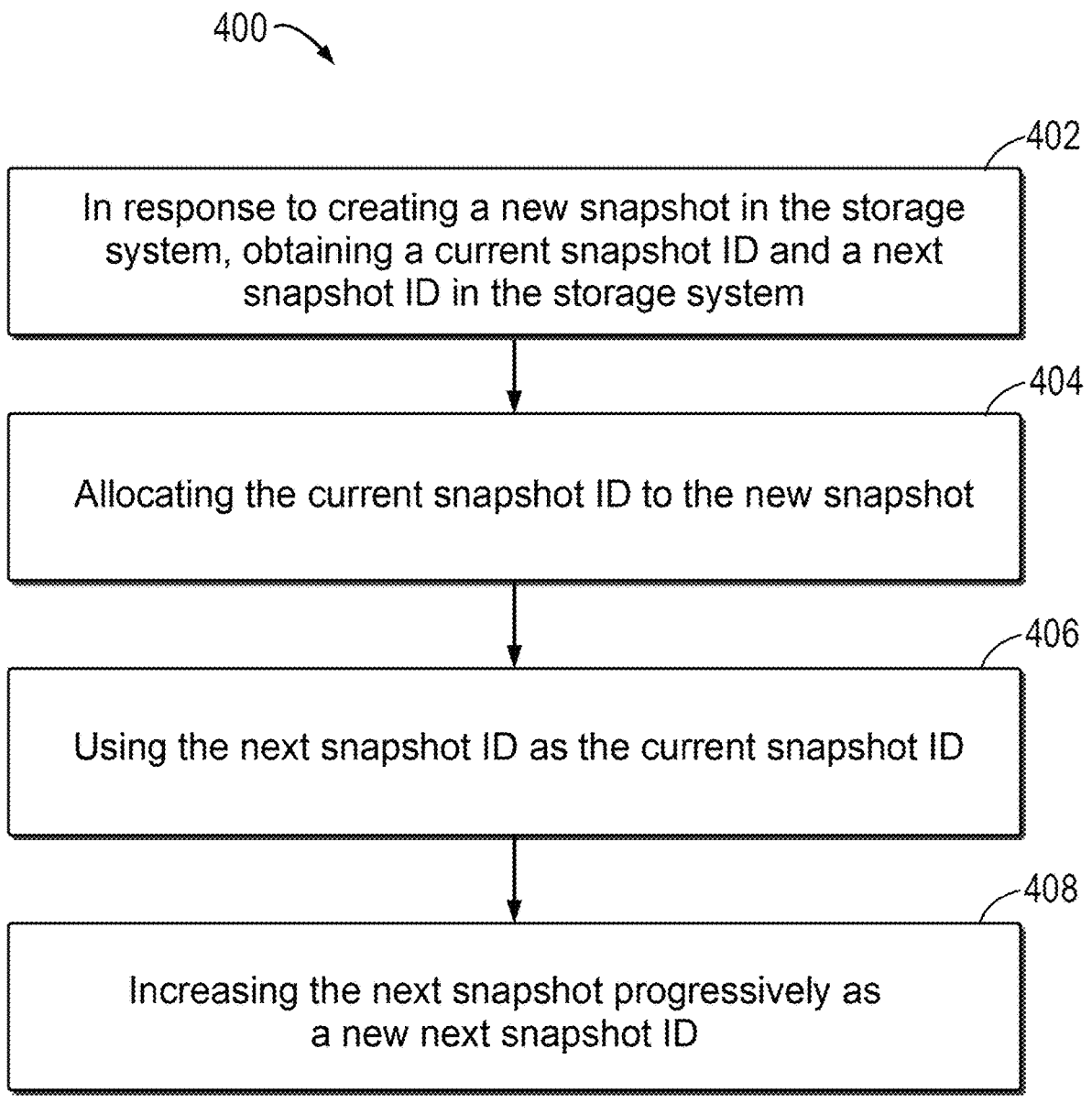
FIG. 4 illustrates a flowchart of a method for updating a snapshot ID according to some embodiments of the present disclosure.

FIG. 4 illustrates a flowchart of a method 400 for updating a snapshot ID according to some embodiments of the present disclosure. As shown in FIG. 4, at block 402, the method 400 includes: in response to creating a new snapshot in the storage system, obtaining a current snapshot ID and a next snapshot ID in the storage system. In some embodiments, the current snapshot ID and the next snapshot ID may be recorded in a superblock of the storage system. When a new snapshot is created in the storage system, information of the current snapshot ID and the next snapshot ID in the superblock may be read. At block 404, the method 400 includes allocating the current snapshot ID to the new snapshot. At block 406, the method 400 includes using the next snapshot ID as the current snapshot ID. At block 408, the method 400 includes increasing the next snapshot progressively as a new next snapshot ID. For example, the current snapshot ID and the next snapshot ID in the current superblock are 10 and 11, respectively. When a new snapshot is created in the storage system, the new snapshot will have a snapshot ID of 10, and the current snapshot ID and the next snapshot ID in the superblock will be updated to 11 and 12, respectively.

Returning to FIG. 3, at block 304, the method 300 includes determining, based on the raw snapshots, at least one of attacked data blocks in the storage system, the data block of the storage system having a data block ID. In some embodiments, the data block ID may be recorded in block metadata (BMD) of the storage system. The BMD may be consistent with the content and allocation status of the data block and built in each block operation that has contact with the data block. For example, when a data block is changed, this will lead to synchronous update of the BMD to reflect a change to that data block. The user cannot directly access the BMD, and accordingly the BMD is typically not destructible by a ransomware attack. In some embodiments, when a data block is created or modified, the data block ID of the data block in the BMD will be updated to the current snapshot ID of the storage system.

In some embodiments, a notable result of a ransomware attack is that files are encrypted and remained in the storage system, so that an inode of the attacked file in the storage system can be detected first. In some embodiments, based on the feature that ransomware typically writes encrypted data sequentially, by a block mapping method, a file number (fsid) of the attacked file and a block number (fsbn) of the attacked data block may be found by finding out the data block with an offset of 0 in the attacked file. For example, when the inode of the attacked file is determined to be 9424, fsid of the attacked file and fsbn of the attacked data block can be obtained through the following block mapping instructions:

```
blk_mapping.pl --mode downward --fsid 536870920 --inode 9424 --offset 0
INFO: Please wait while mapping is ongoing... (details in blk_mapping.log)
[UDFS] fsid=536870920(0x20000008), inode=9424(0x24D0), block_offset_in_file=0
[UDSV] fsid=536870920(0x20000008), fsbn=4294968270(0x1000003CE),
slice=131072(0x20000), block_offset_in_slice=974(0x3CE), qos=0(0)
[LDFS] fsid=1073741831(0x40000007), inode=9441(0x24E1),
block_offset_in_file=66510(0x103CE)
[LDSV] fsid=1073741831(0x40000007), fsbn=1537598656128(0x16600058E80),
slice=46923787(0x2CC000B), block_offset_in_slice=3712(0xE80), qos=1(1)
[FLU] flu_id=1, mlu_device_id=2, sector_offset_in_flu=86173696(0x522E800)
```

Thus, the attacked data block is determined. Then, based on the fsid and fsbn, the corresponding data block ID (replicaId) in the BMD may be obtained:

```
fs_db64.exe readbmd 40000007 0x16600058E80
--- Block Meta Data(v2) @ Sector 0x146000091130(22402550010160) ---
state=16
bitmap=1
icrc=bfbd36bb
crc=0
owner=9441
offset=86173696
totalWeight=131071
replicaId=15
versionSetId=1
gen=32768
blockgen=0
seqnum=1
```

At block 306, the method 300 includes determining, based on the data block ID of each data block of the at least one of the attacked data blocks, a first target snapshot having a corresponding snapshot ID, the first target snapshot having a latest unattacked replica corresponding to the data block. In some embodiments, a second target snapshot having a snapshot ID that is the same as the data block ID of the attacked data block may be determined first. In the second target snapshot, the attacked data block should be changed for the last time, i.e., should be at the beginning of the encryption by the ransomware. Thus, it can be determined that the previous snapshot of the second target snapshot will contain a latest clean replica of the attacked data block, i.e., the first target snapshot.

In some embodiments, it may not be possible to find the first target snapshot or the second target snapshot, that is, the storage system does not contain a latest replica of an attacked data block, and at this time, it is not possible to utilize the snapshot to recover the data block. Nonetheless, according to the embodiments of the present disclosure, it is still possible to quickly determine that all clean replicas of that data block have been lost, which is more efficient than the approach of manually checking snapshots one by one.

At block 308, the method 300 includes recovering the data block corresponding to the first target snapshot by loading the first target snapshot separately for each data block.

In this way, it is possible to detect snapshots containing the latest clean data blocks and to perform block-level recovery from different snapshots to recover as much clean data as possible, in the case that new clean working data and ransomware-encrypted data after a ransomware attack are mixed and coexist in a plurality of snapshots.

In some embodiments, successful recovery of only some of the attacked data blocks in a single file to an earlier version still fails to achieve the desired recovery result since the data blocks of the single file are often associated.

Figure 5:
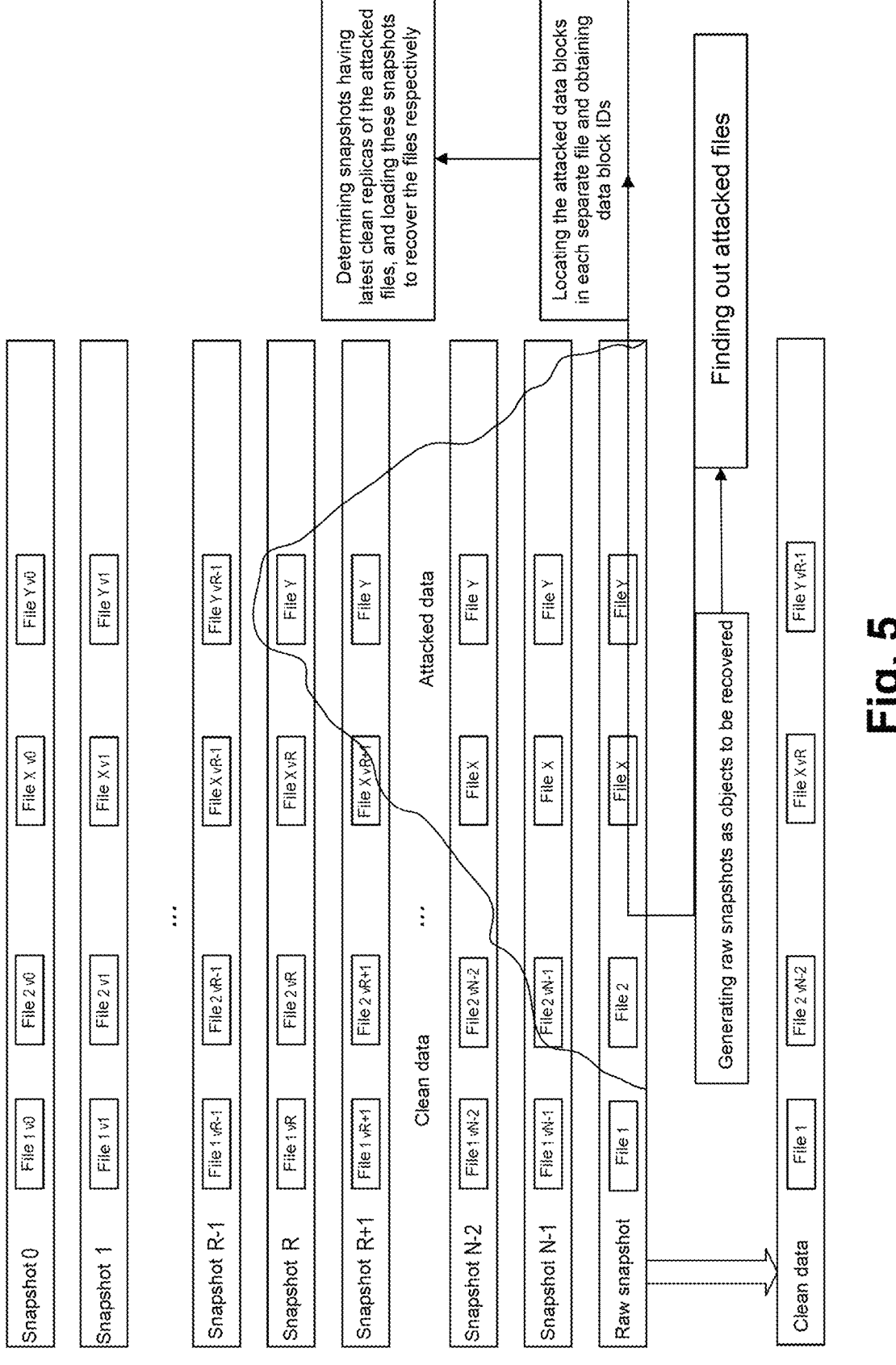
FIG. 5 illustrates a schematic diagram of a process of performing file-level data recovery according to some embodiments of the present disclosure.

FIG. 5 illustrates a schematic diagram of a process of performing file-level data recovery according to some embodiments of the present disclosure. As shown in FIG. 5, a storage system includes N snapshots, and each snapshot has a snapshot ID. Each snapshot includes replicas of Y files in the storage system at a particular time, and a data block in each file has a data block ID. The ransomware first attacks a file Y before a snapshot R is generated, and then keeps lurking to attack other files in the storage system. The ransomware attack is not detected until just before the storage system generates its Nth snapshot. At this point, only a file 1 in the storage system remains not being attacked yet. A user may select a historical snapshot to recover the files in the storage system. However, due to the long-time lurked attack of the ransomware, new clean data and encrypted data of the ransomware are mixed and coexist in a plurality of snapshots, which affects data recovery.

For example, if the user wishes to recover clean versions of all the Y files, data recovery can only be performed with a rollback to a snapshot R−1 using the existing snapshot technology. However, the snapshot R−1 contains only a latest clean replica of the file Y and no latest clean replicas of the other attacked files. According to the embodiments of the present disclosure, it is possible to recover the attacked data to the latest clean version from the data block level. For example, for a file X, according to the embodiments of the present disclosure, it is possible to obtain latest clean replicas of some of the data blocks in a snapshot R+1 that are not attacked; and for some of the data blocks of the file X that are attacked in the snapshot R+1, a snapshot R may be loaded to obtain latest clean replicas of this part of data blocks. However, in the file X, there may be an association between the data blocks, and accordingly the file X composed by the latest clean replicas of the data blocks obtained from different snapshots may not work properly. Therefore, there is a need for a method for recovering data from the file level.

In some embodiments, upon detecting that the storage system is attacked by the ransomware, raw snapshots may first be generated as objects to be recovered, and then may be loaded to find out the attacked files. For example, it may be found in the raw snapshots that all of the files except the file 1 are attacked. Then, by locating the attacked data blocks in each separate file, a third target snapshot having a latest clean replica of the separate file may then be determined.

In some embodiments, the attacked data blocks in a separate file may be located first, and a data block having a minimum data block ID may then be determined, that is, the data block with the minimum data block ID is the first that has been attacked. A snapshot having the same snapshot ID as the minimum data block ID in that file, i.e., a fourth target snapshot, may then be determined. The previous snapshot of the fourth target snapshot will then have the latest clean replica of that separate file. For example, for the file X, it can be determined that the minimum data block ID of the data block in the file X is R+1, and then it can be determined that the third target snapshot having the latest clean replica of that separate file is the snapshot R.

In some embodiments, after snapshots having the latest clean replicas of the attacked files are determined, the files can be recovered by loading these snapshots one by one, respectively. For example, the latest clean replica of a file 2 in a snapshot N−2, the latest clean replica of the file X in the snapshot R, and the latest clean replica of the file Y in the snapshot R−1 can be recovered finally.

Similarly, in the case that the third target snapshot or the fourth target snapshot for a separate file cannot be found, it can be determined that the storage system does not have the latest clean replica of the separate file, which still has a higher efficiency than the approach of manually screening through the snapshots one by one.

In some embodiments, there may be a certain association between the files of the storage system, and these associated files may be organized together based on attributes, labels, and the like to form a file set. Thus, the file set consisting of the latest clean file replicas obtained from different snapshots may not work properly, either.

Figure 6:
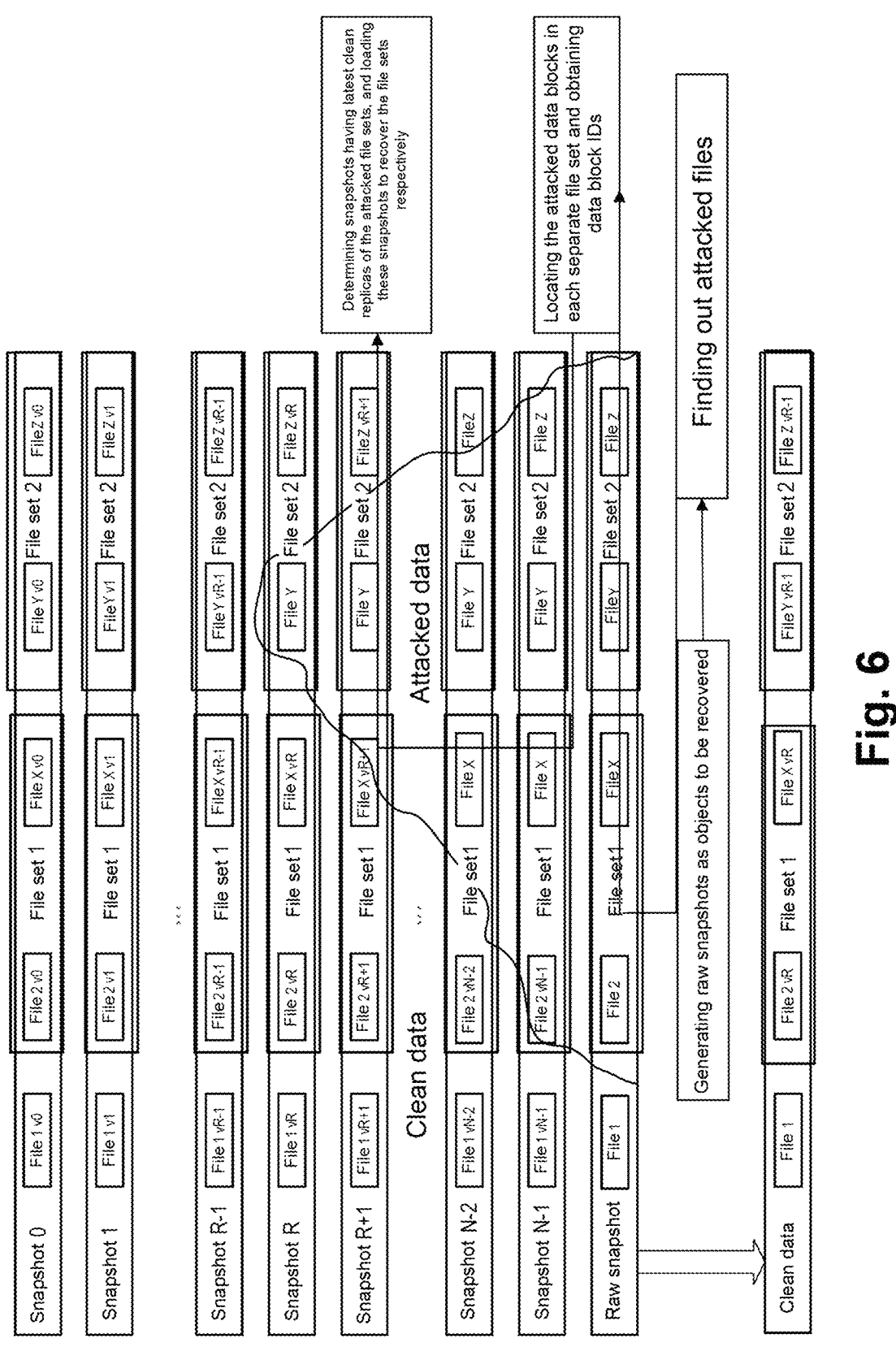
FIG. 6 illustrates a schematic diagram of a process of performing file-set-level data recovery according to some embodiments of the present disclosure.

FIG. 6 illustrates a schematic diagram of a process of performing file-set-level data recovery according to some embodiments of the present disclosure. As shown in FIG. 6, a file 2 and a file X form a file set 1 based on an association, and a file Y and a file Z form a file set 2 based on an association. If data of the storage system is recovered at the file level, a latest clean replica of the file 2 in a snapshot N−2 and a latest clean replica of the file X in a snapshot R may be obtained, and these two different versions of files may not work together.

In some embodiments, similarly, the attacked data blocks in the file set may be located, and a data block having the minimum data block ID may be determined. A snapshot having the same snapshot ID as the minimum data block ID in that file set may then be determined, and then, it can be determined that the previous snapshot of this snapshot has the latest clean replica of that file set.

Figure 7:
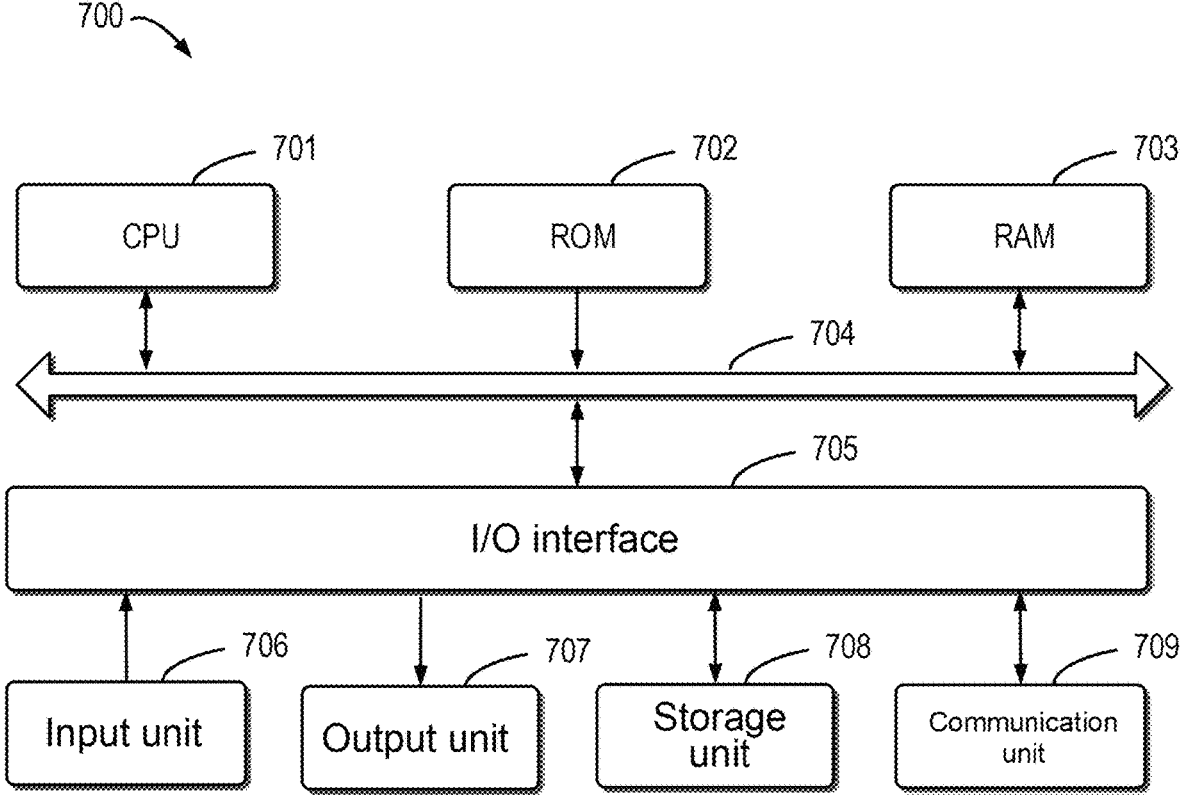
FIG. 7 illustrates a block diagram of a device that can implement a plurality of embodiments of the present disclosure.

FIG. 7 illustrates a schematic block diagram of an example device 700 which can be used to implement embodiments of the present disclosure. As shown in the figure, the device 700 includes a computing unit 701 that can perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The computing unit 701, the ROM 702, and the RAM 703 are connected to each other via a bus 704. An Input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; the storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The computing unit 701 may be various general-purpose and/or special-purpose processing components with processing and computing powers. Some examples of the computing unit 701 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. The computing unit 701 performs various methods and processes described above, such as the method 300. For example, in some embodiments, the method 300 may be implemented as a computer software program that is tangibly included in a machine-readable medium such as the storage unit 708. In some embodiments, part or all of the computer program may be loaded and/or installed onto the device 700 via the ROM 702 and/or the communication unit 709. When the computer program is loaded to the RAM 703 and executed by the computing unit 701, one or more steps of the method 300 described above may be performed. Alternatively, in other embodiments, the computing unit 701 may be configured to implement the method 300 in any other suitable manners (such as by means of firmware).

The functions described hereinabove may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program codes for implementing the method of the present disclosure may be written by using one programming language or any combination of multiple programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for recovering data, comprising:

generating, by a processor, raw snapshots of a storage system, wherein each of the snapshots of the storage system has a snapshot ID;

determining, based on the raw snapshots and by the processor, at least one of attacked data blocks in the storage system, wherein the data block of the storage system has a data block ID;

determining, based on the data block ID of each data block of the at least one of the attacked data blocks and by the processor, a first target snapshot having a corresponding snapshot ID, wherein the first target snapshot has a latest unattacked replica corresponding to the data block;

recovering, by the processor, the data block corresponding to the first target snapshot by loading the first target snapshot separately for each data block;

in response to creating a new snapshot in the storage system and by the processor, obtaining a current snapshot ID and a next snapshot ID in the storage system;

allocating, by the processor, the current snapshot ID to the new snapshot;

using, by the processor, the next snapshot ID as the current snapshot ID; and increasing, by the processor, the next snapshot progressively as a new next snapshot ID.

2. The method according to claim 1, further comprising:

in response to a data block in the storage system being changed, obtaining a current snapshot ID of the storage system to serve as a data block ID for the changed data block; and in response to allocating a new data block in the storage system, obtaining a current snapshot ID of the storage system to serve as a data block ID for the new data block.

3. The method according to claim 2, wherein determining a first target snapshot having a corresponding snapshot ID comprises:

determining a second target snapshot having a snapshot ID that is the same as the data block ID of the at least one of the attacked data blocks; and using the previous snapshot of the second target snapshot as the first target snapshot.

4. The method according to claim 3, wherein determining a first target snapshot having a corresponding snapshot ID further comprises:

in response to the storage system not having the first target snapshot or the second target snapshot, determining that the at least one of the attacked data blocks cannot be recovered.

5. The method according to claim 2, further comprising:

determining, based on an association between the data blocks of the storage system, a data block group containing the at least one of the attacked data blocks;

determining a third target snapshot having a latest unattacked replica of the data block group; and recovering a data block group corresponding to the third target snapshot by loading the third target snapshot separately for each data block group.

6. The method according to claim 5, wherein the association between the data blocks of the storage system comprises:

files corresponding to the data blocks of the storage system being consistent; and the files corresponding to the data blocks of the storage system being associated.

7. The method according to claim 5, wherein determining a third target snapshot having a latest unattacked replica of the data block group comprises:

determining in the data block group an attacked data block having a minimum data block ID;

determining a fourth target snapshot having a snapshot ID that is the same as the minimum data block ID of the data block group; and using the previous snapshot of the fourth target snapshot as the third target snapshot.

8. The method according to claim 7, wherein determining a third target snapshot having a latest unattacked replica of the data block group further comprises:

in response to the storage system not having the third target snapshot or the fourth target snapshot, determining that the data block group containing the at least one of the attacked data blocks cannot be recovered.

9. The method according to claim 1, wherein determining at least one of attacked data blocks in the storage system comprises:

in response to detecting that at least one file in the storage system is attacked, determining an inode of at least one of the attacked files;

determining, based on the inode of the at least one of the attacked files, a file number of the at least one of the attacked files and a block number of the at least one of the attacked data blocks; and determining, based on the file number and the block number, the at least one of the attacked data blocks.

10. An electronic device, comprising:

at least one processor; and memory coupled to the at least one processor and having instructions stored thereon, wherein the instructions, when executed by the at least one processor, cause the electronic device to perform actions comprising:

generating raw snapshots of a storage system, wherein each of the snapshots of the storage system has a snapshot ID;

determining, based on the raw snapshots, at least one of attacked data blocks in the storage system, wherein the data block of the storage system has a data block ID;

determining, based on the data block ID of each data block of the at least one of the attacked data blocks, a first target snapshot having a corresponding snapshot ID, wherein the first target snapshot has a latest unattacked replica corresponding to the data block; and recovering the data block corresponding to the first target snapshot by loading the first target snapshot separately for each data block;

wherein the actions further comprise:

in response to creating a new snapshot in the storage system, obtaining a current snapshot ID and a next snapshot ID in the storage system;

allocating the current snapshot ID to the new snapshot;

using the next snapshot ID as the current snapshot ID; and increasing the next snapshot progressively as a new next snapshot ID.

11. The device according to claim 10, wherein the actions further comprise:

in response to a data block in the storage system being changed, obtaining a current snapshot ID of the storage system to serve as a data block ID for the changed data block; and in response to allocating a new data block in the storage system, obtaining a current snapshot ID of the storage system to serve as a data block ID for the new data block.

12. The device according to claim 11, wherein determining a first target snapshot having a corresponding snapshot ID comprises:

determining a second target snapshot having a snapshot ID that is the same as the data block ID of the at least one of the attacked data blocks; and using the previous snapshot of the second target snapshot as the first target snapshot.

13. The device according to claim 12, wherein determining a first target snapshot having a corresponding snapshot ID further comprises:

in response to the storage system not having the first target snapshot or the second target snapshot, determining that the at least one of the attacked data blocks cannot be recovered.

14. The device according to claim 11, wherein the actions further comprise:

determining, based on an association between the data blocks of the storage system, a data block group containing the at least one of the attacked data blocks;

determining a third target snapshot having a latest unattacked replica of the data block group; and recovering a data block group corresponding to the third target snapshot by loading the third target snapshot separately for each data block group.

15. The device according to claim 14, wherein the association between the data blocks of the storage system comprises:

files corresponding to the data blocks of the storage system being consistent; and the files corresponding to the data blocks of the storage system being associated.

16. The device according to claim 14, wherein determining a third target snapshot having a latest unattacked replica of the data block group comprises:

determining in the data block group an attacked data block having a minimum data block ID;

determining a fourth target snapshot having a snapshot ID that is the same as the minimum data block ID of the data block group; and using the previous snapshot of the fourth target snapshot as the third target snapshot.

17. The device according to claim 16, wherein determining a third target snapshot having a latest unattacked replica of the data block group further comprises:

in response to the storage system not having the third target snapshot or the fourth target snapshot, determining that the data block group containing the at least one of the attacked data blocks cannot be recovered.

18. The device according to claim 10, wherein determining at least one of attacked data blocks in the storage system comprises:

in response to detecting that at least one file in the storage system is attacked, determining an inode of at least one of the attacked files;

determining, based on the inode of the at least one of the attacked files, a file number of the at least one of the attacked files and a block number of the at least one of the attacked data blocks; and determining, based on the file number and the block number, the at least one of the attacked data blocks.

19. A computer program product having a non-transitory computer readable medium which stores a set of instructions to recover data; the set of instructions, when carried out by computerized circuitry, causing the computerized circuitry to perform a method of:

generating raw snapshots of a storage system, wherein each of the snapshots of the storage system has a snapshot ID;

determining, based on the raw snapshots, at least one of attacked data blocks in the storage system, wherein the data block of the storage system has a data block ID;

determining, based on the data block ID of each data block of the at least one of the attacked data blocks, a first target snapshot having a corresponding snapshot ID, wherein the first target snapshot has a latest unattacked replica corresponding to the data block; and recovering the data block corresponding to the first target snapshot by loading the first target snapshot separately for each data block; and in response to creating a new snapshot in the storage system, obtaining a current snapshot ID and a next snapshot ID in the storage system;

allocating the current snapshot ID to the new snapshot;

using the next snapshot ID as the current snapshot ID; and increasing the next snapshot progressively as a new next snapshot ID.

20. The computer program product according to claim 19, wherein determining at least one of attacked data blocks in the storage system comprises:

in response to detecting that at least one file in the storage system is attacked, determining an inode of at least one of the attacked files;

determining, based on the inode of the at least one of the attacked files, a file number of the at least one of the attacked files and a block number of the at least one of the attacked data blocks; and determining, based on the file number and the block number, the at least one of the attacked data blocks.

\* \* \* \* \*